Figure 1:
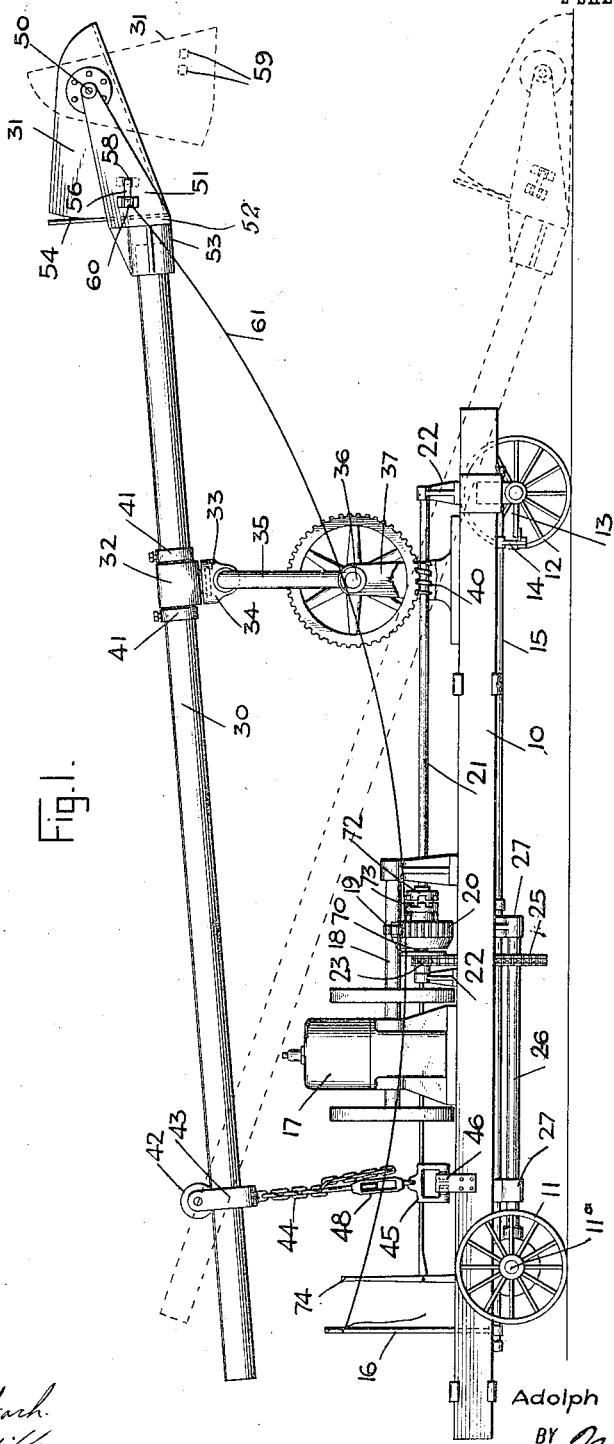

A. OFFERMANN.
POWER SHOVEL.
APPLICATION FILED APR. 25, 1912.

1,064,528.

Patented June 10, 1913.
2 SHEETS—SHEET 1.

WITNESSES

INVENTOR
Adolph Offermann
BY
ATTORNEYS

A. OFFERMANN.
POWER SHOVEL.
APPLICATION FILED APR. 25, 1912.
1,064,528.
Patented June 10, 1913.
2 SHEETS—SHEET 2.
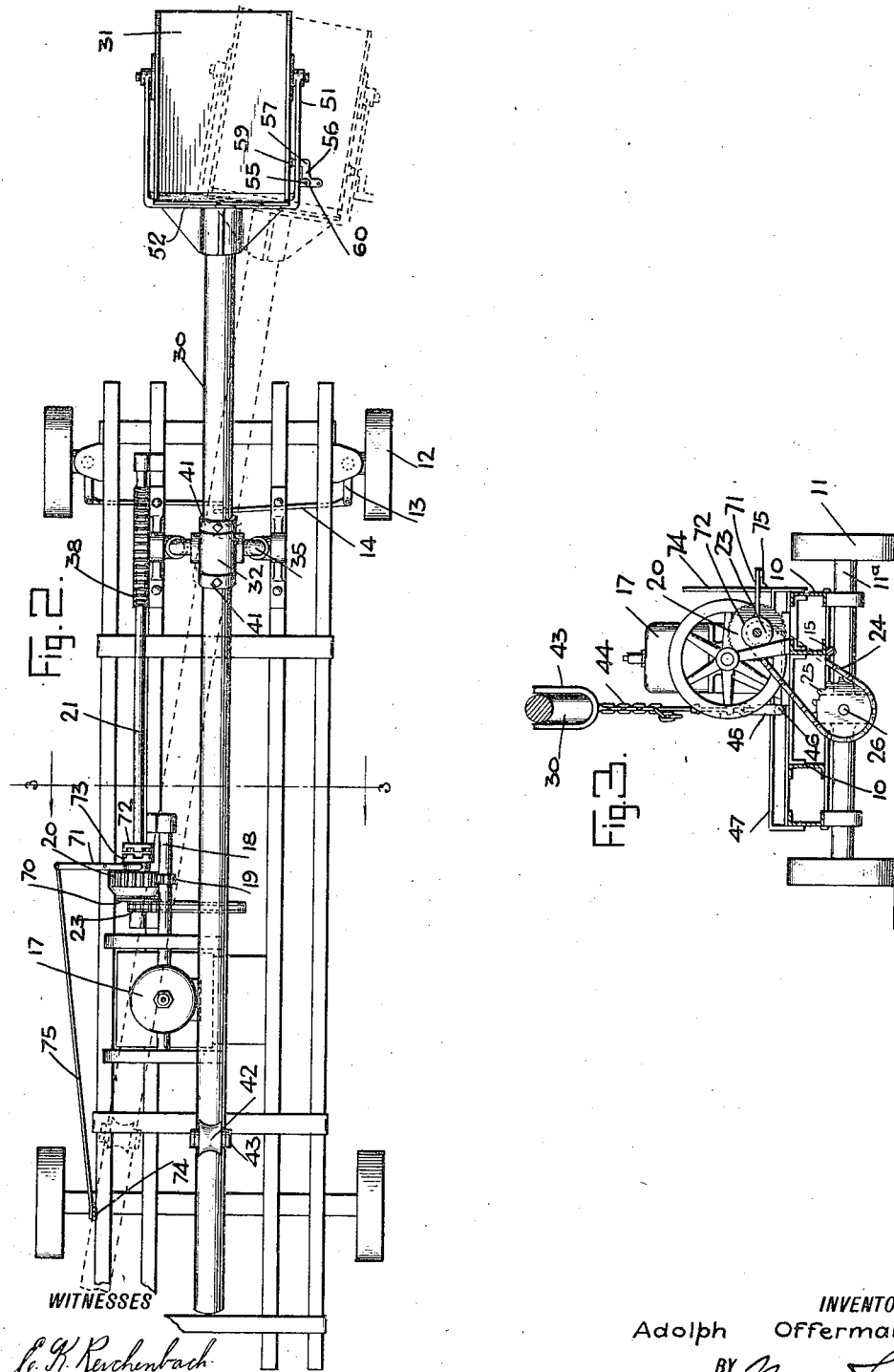
WITNESSES
*C. R. Reichenbach*
*J. R. McAuliff*
INVENTOR
Adolph Offermann
BY *Mumm & Co*
ATTORNEYS

UNITED STATES PATENT OFFICE.

ADOLPH OFFERMANN, OF DAVENPORT, IOWA.

POWER-SHOVEL.

1,064,528. Specification of Letters Patent. Patented June 10, 1913.

Application filed April 25, 1912. Serial No. 693,018.

*To all whom it may concern:*

Be it known that I, ADOLPH OFFERMANN, a citizen of the United States, and a resident of Davenport, in the county of Scott and State of Iowa, have invented a new and Improved Power-Shovel, of which the following is a full, clear, and exact description.

My invention relates more particularly to the class of power shovels mounted on a wheeled truck or carriage, and having means for raising and lowering the shovel and dumping the scoop forming part of the shovel.

The invention comprises a long arm or lever, on the forward end of which a scoop is mounted, the lever being swiveled in a block or socket mounted on a crank shaft, the lever and scoop having suitable controlling devices, and means being provided to turn the crank shaft to raise and lower the shovel, and means to propel the truck on which the shovel is carried.

The distinguishing features of my invention, and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 1 is a side elevation of a power shovel embodying my invention; Fig. 2 is a plan view thereof; and Fig. 3 is a cross section on the line 3—3 of Fig. 2.

In constructing a shovel in accordance with the illustrated example, a suitable truck frame 10 is provided, having rear running wheels 11 and front running wheels 12. The front wheels may have a known form of steering knuckles, of which 13 indicates the steering arms connected by links 14 to a rock shaft 15, having a lever 16 conveniently located, preferably near the rear end of the truck behind the motor 17. The motor is of any approved form, the drawings illustrating conventionally an internal combustion engine. Any suitable transmission devices are provided between the motor and the axle on the rear wheels 11. In the present instance the engine shaft 18 has a spur pinion 19 meshing with a spur gear 20 on the counter-shaft 21, which is mounted in bearings on standards 22. On the counter-shaft 21 is a sprocket pinion 23, and a sprocket chain 24 runs over said sprocket pinion and over a sprocket wheel 25 on a transmission shaft 26, which is mounted in hangers 27 at the under side of the truck frame 10, and has any suitable driving connections (not shown) with the rear axle 11$^a$.

The lever arm 30 carries the scoop 31 at its forward end, and said lever is mounted in a sleeve 32 formed on a turntable 33, the turntable being socketed in a socket or block 34, which is loosely mounted on the arm 35 of a crank shaft 36, said shaft being journaled in standards 37 on the truck frame 10. The crank shaft 36 is provided at one end with a worm wheel 38, and meshing with said worm wheel is a worm 40 on the counter-shaft 21. Set collars 41 are provided on the shovel lever or arm 30 at each side of the swiveled sleeve 32 through which the said lever passes, the collars serving to adjust the lever 30 lengthwise to project the scoop 31 more or less beyond the front of the truck as desired.

The rear of the lever arm 30 of the shovel carries a friction roller 42, which is journaled in the upper ends of the arms of a shackle 43, and said shackle has suitable flexible connection, as by a chain 44 with a trolley 45, the said trolley having inwardly extending lower ends provided with rollers 46 that run against the under side of a trolley rail or guide bar 47 that ranges transversely of the truck. The chain 44 is preferably provided with a turnbuckle 48, for adjusting its tension in an obvious manner.

The scoop 31 is pivoted, as at 50, between the cheeks 51 which extend forwardly from the cross bar 52, said cross bar having a hub 53 mounted on the forward end of the lever arm 30. The scoop 31 is open at both ends, and the rear end, when the scoop is in the raised or closed position, is opposite a fixed plate 54 which is suitably secured to the cross bar 52 of the scoop frame. On one of the cheeks 51 of the scoop frame is pivoted, as at 55, an angular latch 56. The latch 56 has two arms projecting laterally in opposite directions, the one arm 57 extending through an opening 58 in the adjacent cheek 51, and into engagement with the side of the scoop 31. Any suitable means may be provided on the side of the scoop to engage the latch; in the form shown there are two spaced projections 59, between which the latch is received when the scoop is in the raised position. To the opposite arm 60 of the latch 56, a latch string 61 is connected, said latch string extending to any suitable point adjacent to the engine, to be within convenient reach of the operator, and tied to any adjacent member, as for instance, to the lever 16.

The mentioned spur gear 20 on the counter-shaft 21 is loose on said shaft, and suitable clutches are provided for throwing said spur gear into driving connection with the counter-shaft 21, or with the sprocket pinion 23 that actuates the sprocket chain 24 of the transmission devices. Thus there is a friction disk 70 in fixed relation to the loose sprocket pinion 23, and a shifting lever 71 serves to throw one side face of the spur gear 20 into frictional engagement with the disk 70, or to throw said gear 20 into driving connection with the counter-shaft 21 through the action of positive clutch disks 72, 73, provided with suitable projections and interdental spaces for engaging and disengaging each other. The clutch disk 72 is in fixed relation to the counter-shaft 21, while the disk 73 is in fixed relation to the loose spur gear 20, and is thus loose on the counter-shaft 21. The shifting lever 71 is actuated by a clutch lever 74 and connecting rod 75, or other equivalent means. By throwing the lever 74 in one direction the spur pinion 20 will be shifted into frictional driving contact with the friction disk 70 for turning the loose sprocket 23 and actuating the transmission shaft 26 and propelling the truck; while when the said shifting lever is thrown in the opposite direction a sufficient distance, the spur pinion 20 is so shifted as to throw the clutch disk 73 into clutching engagement with the mating disk 72, to turn the counter-shaft 21 and thereby cause the worm 40 on said shaft to turn the worm wheel 37 on the crank shaft 36, to revolve said crank shaft and thereby raise and lower the shovel lever or arm 30 and its scoop. The spur gear 20 may occupy a neutral position and not act on either clutch. When the shovel has been advanced and loaded by a forward movement, and raised to the proper height, the chain 44 and its trolley 45 may be shifted laterally to swing the rear end of the shovel lever 30, causing the swiveled sleeve 33 to turn relatively to the crank shaft 35, and thus shifting the scoop 31 laterally to bring it to the proper point to be dumped, as into a wagon, or otherwise at the side of an excavation. When the scoop has reached its point of dumping, a pull on the latch string 61 releases the latch 56, thus releasing the scoop 31, and permitting the same to dump its load, the dumping position of the scoop being indicated by dotted lines at the upper portion of Fig. 1. The scoop gives a preponderance of weight at the front of the lever arm, and the arm tends to rock vertically on the crank 35 of the crank shaft 36, pressing the rear end of the lever against the under side of the roller 42. The shaft 36 is so rotated as to give the forward movement to the shovel on the lower swing of the crank, and therefore in the lowered position of the crank the scoop assumes the position indicated by dotted lines at the bottom of Fig. 1. The rotation of the shaft causes the pivotal point of the shovel arm to describe a circle, and this, with the downward rocking of the front end of the shovel arm and scoop as the crank moves downwardly and forwardly at the under side, will give the scoop a movement downwardly, forwardly and then upwardly. Thus the rotation of the shaft as described loads the scoop and elevates it to the desired height, to be again manipulated and dumped as previously described. When it is desired to advance the shovel bodily, the clutch sections 72, 73, are disengaged and the pinion 20 thrown into frictional engagement with the disk 70, to propel the truck forward.

It is to be understood that the invention is not limited to the illustrated constructional form, and equivalent mechanism may be employed to give the shovel substantially the same cycle of operations, including the downward and forward loading movement, and the upward movement and dumping action described; the crank shaft is, however, the preferred means for giving the shovel handle the desired movements, as its action is positive and its construction and operation simple.

Having thus described my invention, I claim as new, and desire to secure by Letters Patent:

1. In a power shovel, an arm carrying a pivoted scoop, a crank shaft on which said arm is swiveled and mounted to rock in a vertical plane, a restraining device engaging the arm in the rear of the crank shaft, and a trolley rail on which said restraining device has guided movement in a direction transverse to the length of the shovel arm.

2. A power shovel comprising a shovel arm carrying a pivoted scoop, a crank shaft, means for actuating said shaft, connections between the cranked portion of the shaft and the shovel arm, said connections permitting the vertical rocking of the shovel relatively to the shaft and a lateral swiveling of the shovel, a restraining device for the rear end of the shovel arm, said restraining device comprising a roller traveling on the shovel arm, a member carrying said roller, a rail, a device having guided movement on the rail, transversely to the said shovel, and connections between the said device traveling on the rail and the roller member.

3. In a power shovel, an elongated shovel arm carrying a scoop, a crank shaft, a block loosely mounted on the cranked portion of said shaft, a sleeve on the shovel arm and having swiveled connection with the said block, and actuating means for the crank shaft.

4. In a power shovel, an arm carrying a scoop at one end, a carrying and supporting member on which said arm is mounted to turn laterally at a point between the ends of the arm, and means for giving to said member, and with it the scoop arm and scoop carried thereon, a forward and upward movement for loading and raising the scoop, and a rearward and downward movement to its original position.

5. In a power shovel, an arm carrying a scoop at its forward end, a member on which said arm is mounted, at a point between the ends of the arm, to turn laterally, means for raising and lowering said member and the scoop-carrying arm, and manually-controlled means engaging the rear end of the arm, said means having guided lateral movement to swing the arm and scoop laterally.

In testimony whereof I have signed my name to this specification in the presence of two subscribing witnesses.

ADOLPH OFFERMANN.

Witnesses:
JOSEPH M. LLOYD,
SAMUEL J. EVANS.